No. 844,003. PATENTED FEB. 12, 1907.
J. F. CONRAD.
BACK PRESSURE VALVE FOR DRAIN TRAPS.
APPLICATION FILED APR. 20, 1906.
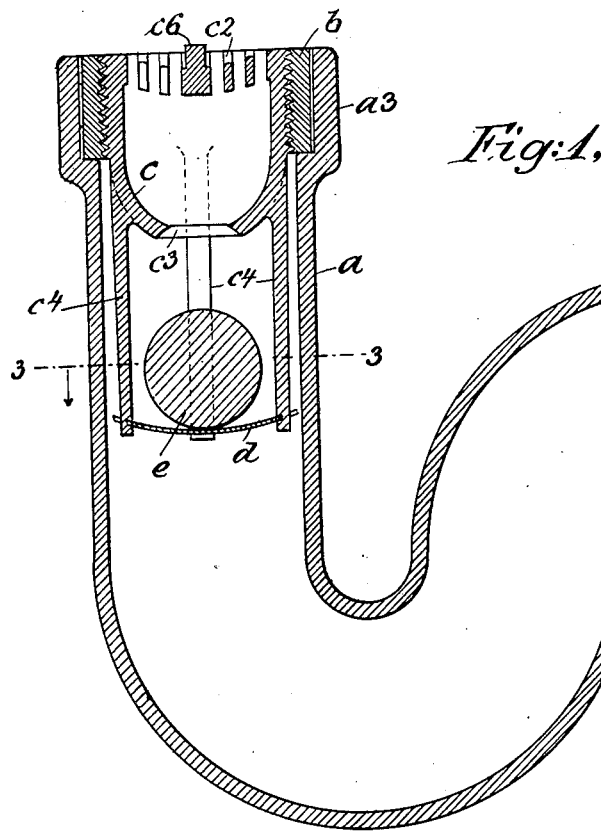
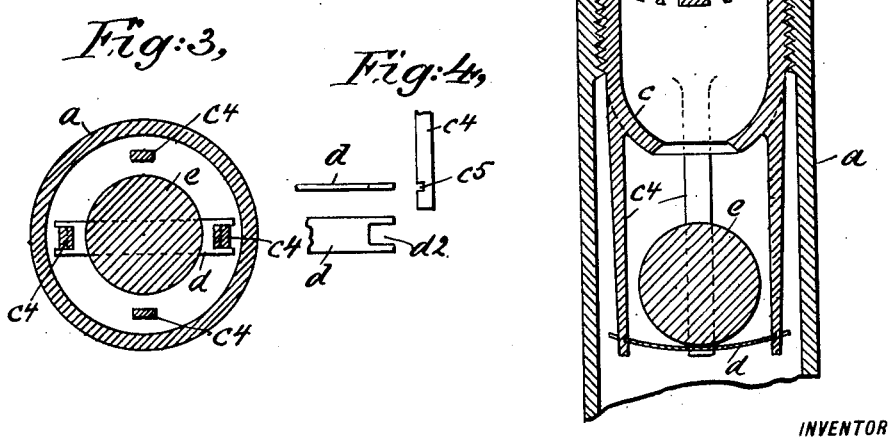
WITNESSES
INVENTOR
John F. Conrad,
BY Edgar Tate & Co
ATTORNEYS

UNITED STATES PATENT OFFICE.

JOHN F. CONRAD, OF ELIZABETH, NEW JERSEY.

BACK-PRESSURE VALVE FOR DRAIN-TRAPS.

No. 844,003.  Specification of Letters Patent.  Patented Feb. 12, 1907.

Application filed April 20, 1906. Serial No. 312,842.

*To all whom it may concern:*

Be it known that I, JOHN F. CONRAD, a citizen of the United States, and residing at Elizabeth, in the county of Union and State of New Jersey, have invented certain new and useful Improvements in Back-Pressure Valves for Drain-Traps, of which the following is a specification, such as will enable those skilled in the art to which it appertains to make and use the same.

This invention relates to drain-traps such as are usually employed in cellars, kitchens, closets, and other places of this kind; and the object thereof is to provide a trap of this class with a combination strainer and back-pressure-valve device which will prevent backflow through the trap and which is simple in construction and operation and can be conveniently applied to traps of the class specified whenever and wherever desired.

The invention is fully disclosed in the following specification, of which the accompanying drawings form a part, in which the separate parts of my improvement are designated by suitable reference characters in each of the views, and in which—

Figure 1 is a central vertical section of a drain-trap provided with my improvement; Fig. 2, a similar view of a part thereof, but showing a modification; Fig. 3, a cross-section on the line 3 3 of Fig. 1, and Fig. 4 detail views of part of the construction employed.

In the drawings forming part of this specification I have shown an ordinary drain-trap having an inlet side or leg $a$ and an outlet side or leg $a^2$. The separate sides or legs of a trap of this class are usually formed or provided with hubs $a^3$, and in the practice of my invention, as shown in Fig. 1, I secure in the inlet side or leg of the trap a sleeve $b$, having an interior thread, and said sleeve may be secured in the hub $a^3$ of the inlet side or leg of the trap by calking in the usual manner or in any preferred way. I also provide a combination drain and valve device comprising a cup-shaped member $c$, having a perforated or gridwork top $c^2$ and provided in the bottom thereof with a central port or passage $c^3$, and the cup-shaped member or device $c$ is provided with downwardly-directed fingers $c^4$, two or more of which are connected at the bottom thereof in the form of construction by a detachable spring-support $d$, and the fingers $c^4$ and detachable spring-support $d$ form a cage in which is placed a spherical valve $e$.

In the form of construction shown two or more of the fingers $c^4$ are provided near their lower ends and in the inner sides thereof with a recess $c^5$, and the detachable spring-support $d$ is provided in its opposite ends with recesses $d^2$, and by means of this construction the spring-support $d$ may be detachably connected with the fingers $c^4$, as shown in the drawings. The top body portion of the cup-shaped member $c$ is threaded to corrspond with the thread in the sleeve $b$, and in practice the combination drain and valve device is screwed into the sleeve $b$, as shown in Fig. 1. The operation of this form of construction will be readily understood from the foregoing description when taken in connection with the accompanying drawings and the following statement thereof. It will be understood that the operation of the trap under ordinary conditions will be the same as that of any other trap of this kind; but if at any time or for any reason there should be a backflow through the trap the valve $e$ will be raised and will close the port or passage $c^3$ in the bottom of the cup-shaped member $c$, and the water cannot escape through the trap no matter what the back pressure may be.

The top portion of the cup-shaped member $c$ may be made in any desired manner or in the usual way; but said top portion in practice is provided centrally with an angular lug or projection $c^6$, to which a wrench may be applied in securing the combination drain and valve device into the sleeve $b$ or removing it therefrom.

In Fig. 2 I have shown a modification in which the inlet side or leg $a$ of the trap is not provided with the hub $a^3$, and in this form of construction the top end portion of the inlet side or leg of the trap is threaded to correspond with the thread on the outer side of the body portion of the cup-shaped member $c$ of the combination strainer and valve device, and in practice the combination strainer and valve device is screwed into the inlet side or leg of the trap and may be removed therefrom whenever desired.

My invention is not limited to any particular means for supporting the valve $e$ in the cage with which the cup-shaped member $c$ of the combination strainer and valve device is provided, the only object in this connection being to provide the cup-shaped member $c$ with a cage which will support the valve in proper operative position and which is removable from the trap with the cup-shaped member $c$.

Although I have shown the part c provided with an exterior thread whereby it may be screwed into the inlet side or leg a of the trap or into the sleeve b, it will be apparent that this form of construction is not absolutely necessary, and the cup-shaped member c may be bolted or otherwise secured to the top of the sleeve b or to the top of the inlet side or leg of the trap.

Having fully described my invention, what I claim as new, and desire to secure by Letters Patent, is—

1. A combination strainer and back-pressure-valve device adapted for use in the inlet side of a drain-trap, comprising a cup-shaped member having a port in the bottom thereof and a strainer at the top, said cup-shaped member being also provided below the bottom thereof with a cage adapted to receive a ball-valve, said cage consisting of downwardly-directed fingers connected with said cup-shaped member and detachable parts connected with said fingers, and a ball-valve which is adapted to be placed in said cage or removed therefrom by detaching said detachable parts.

2. A combination strainer and back-pressure-valve device adapted to be secured in the inlet side of a drain-trap, comprising a cup-shaped member having a port in the bottom thereof and an open-work top, said cup-shaped member being also provided at the bottom thereof with downwardly-directed fingers connected by detachable transverse members and forming a cage, and a ball-valve placed in said cage and adapted to close said port.

In testimony that I claim the foregoing as my invention I have signed my name, in presence of the subscribing witnesses, this 11th day of April, 1906.

JOHN F. CONRAD.

Witnesses:
F. A. STEWART,
C. E. MULREANY.